(12) United States Patent
Baron et al.

(10) Patent No.: US 8,474,241 B2
(45) Date of Patent: Jul. 2, 2013

(54) ENGINE WITH INTAKE AIR TEMPERATURE CONTROL SYSTEM

(75) Inventors: Peter John Baron, San Diego, CA (US); David Anthony Pocengal, San Diego, CA (US); Rainer Kurz, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 1254 days.

(21) Appl. No.: 12/073,148

(22) Filed: Feb. 29, 2008

(65) Prior Publication Data

US 2009/0060725 A1   Mar. 5, 2009

Related U.S. Application Data

(60) Provisional application No. 60/970,246, filed on Sep. 5, 2007.

(51) Int. Cl.
*F02C 7/10*   (2006.01)
*F02C 1/00*   (2006.01)
*F02K 99/00*  (2009.01)

(52) U.S. Cl.
USPC .................. 60/267; 60/39.511; 60/728

(58) Field of Classification Search
USPC .............. 60/728, 39.5, 730, 39.511, 266, 267
See application file for complete search history.

(56) References Cited

U.S. PATENT DOCUMENTS

| | | | |
|---|---|---|---|
| 2,718,753 A | * | 9/1955 | Bridgeman ............... 60/772 |
| 2,783,624 A |   | 3/1957 | Morrison |
| 2,795,937 A |   | 6/1957 | Sattler et al. |

(Continued)

FOREIGN PATENT DOCUMENTS

| WO | WO 03/089771 A1 | 10/2003 |
|---|---|---|
| WO | WO 2006068832 | * 6/2006 |

OTHER PUBLICATIONS

Cameron, Ian, Propulsion System Debate Sails on, LNG Production, Transportation & Storage, Diesel & Gas Turbine Worldwide, Jul.-Aug. 2006, 2 pages.

(Continued)

*Primary Examiner* — Gerald Sung
(74) *Attorney, Agent, or Firm* — Finnegan, Henderson, Farabow, Garrett & Dunner LLP

(57) ABSTRACT

A gas turbine engine system includes a gas turbine engine using vaporized liquefied gas as fuel. The gas turbine engine is configured to ingest intake air from an intake port and direct exhaust gases to an exhaust port. The gas turbine engine system also includes a heat exchanger with a heat transfer fluid therein. The heat exchanger is configured to create at least a part of the fuel by heating the liquefied gas. The gas turbine engine system also includes an intake air temperature control circuit. The intake air temperature control circuit includes conduits configured to direct the heat transfer fluid to the intake port and the exhaust port. The gas turbine engine system also includes a control system configured to selectively direct the heat transfer fluid to one of the intake port and the exhaust port.

20 Claims, 6 Drawing Sheets

U.S. PATENT DOCUMENTS

| | | | |
|---|---|---|---|
| 3,387,462 A | | 6/1968 | Bauger et al. |
| 3,552,134 A | * | 1/1971 | Arenson .................. 62/50.2 |
| 3,631,673 A | * | 1/1972 | Charrier et al. ............ 60/39.183 |
| 3,720,057 A | * | 3/1973 | Arenson .................. 60/772 |
| 3,857,245 A | | 12/1974 | Jones |
| 3,919,852 A | | 11/1975 | Jones |
| 4,204,401 A | | 5/1980 | Earnest |
| 4,329,842 A | * | 5/1982 | Hoskinson ............... 60/39.465 |
| 5,295,350 A | * | 3/1994 | Child et al. .............. 60/780 |
| 5,390,505 A | | 2/1995 | Smith et al. |
| 5,400,588 A | * | 3/1995 | Yamane et al. ............ 60/39.465 |
| 5,626,019 A | | 5/1997 | Shimizu et al. |
| RE35,874 E | | 8/1998 | Neeser et al. |
| 6,202,400 B1 | | 3/2001 | Utamura et al. |
| 6,513,318 B1 | | 2/2003 | Wright |
| 6,688,114 B2 | | 2/2004 | Nierenberg |
| 7,219,502 B2 | | 5/2007 | Nierenberg |
| 7,266,946 B2 | * | 9/2007 | Fletcher et al. ............ 60/785 |
| 7,296,413 B2 | * | 11/2007 | Brenneke et al. .......... 60/772 |
| 7,484,371 B2 | * | 2/2009 | Nierenberg ............... 62/50.2 |
| 7,980,081 B2 | * | 7/2011 | Mak .................. 60/779 |
| 2003/0033796 A1 | * | 2/2003 | Dixon .................. 60/39.281 |
| 2005/0126179 A1 | * | 6/2005 | Fletcher et al. ............ 60/776 |
| 2007/0277534 A1 | | 12/2007 | Nierenberg |

OTHER PUBLICATIONS

Gaughan, James, Economics, environment driving new generation of LNG carriers, LNB Observer, Jul. 1, 2006, vol. 3, issue 3, PennWell Corporation, Tulsa, Oklahoma, 7 pages.

Janes, Jack, A Fully Enhanced Gas Turbine for Surface Ships, International Gas Turbine Institute, The American Society of Mechanical Engineers, Atlanta, Georgia, Jun. 10-12, 1996, 12 pages.

Wayne, W.S., Cooke, J.D., Rooke, R.W., Morley, J., A Natural Evolution of the Modern LNG Carrier—The Application of Gas Turbines for LNG Carrier Propulsion Systems, 8 pages.

Westport, Wal-Mart sign LNG truck agreement, Energy Current, Feb. 7, 2008, Houston, downloaded from http://www.energycurrent.com/?id=3&storyid=8690 on Feb. 27, 2008, 2 pages.

Fuelling the Future, Rolls-Royce, 2 pages.

Gas Turbines for LNG Carriers, 1998, 2008 Scientia Technologies Corporation, downloaded from http://www.marinetalk.com/articles-marine-companies/art/Gas-Turbines-for-LNG-Carriers-GEM01010333 on Feb. 27, 2008, 2 pages.

Gas Turbine Electric Drive LNG Carrier, Feb. 14, 2008, downloaded from http://www.mptconsult.com/LNGC%20GTGhtm on Feb. 14, 2008, 5 pages.

\* cited by examiner

ENGINE WITH INTAKE AIR TEMPERATURE CONTROL SYSTEM

CROSS REFERENCE TO RELATED APPLICATIONS

This application is based upon and claims the benefit of priority from U.S. Provisional Application No. 60/970,246 to Baron et al. filed on Sep. 5, 2007.

TECHNICAL FIELD

The present disclosure relates generally to an engine system, and more particularly, to an engine with intake air temperature control system.

BACKGROUND

An engine produces energy by combusting a fuel. A gas turbine engine is a type of engine that produces energy by combusting a mixture of fuel and air. A gaseous fuel used in gas turbine engines is natural gas. Natural gas may be transported from a location where it is produced to a location where it is consumed by tanker ships equipped with cryogenic compartments. Such a tanker may be referred to as an LNG carrier. Since liquefied natural gas ("LNG") takes up only a fraction (about 1/600) of the volume of natural gas in its gaseous state, natural gas is transported in the LNG carrier in a liquefied state. LNG may be produced by cooling natural gas below its boiling point (about −259° F. at ambient pressure). LNG may be stored in cryogenic containers either at or slightly above atmospheric pressure in the LNG carrier. By raising the temperature of the LNG, it may be converted back to its gaseous form. LNG carriers transport LNG over regions with widely varying temperatures. For instance, natural gas produced in locations such as Algeria, Borneo, or Indonesia, may be liquefied and transported on LNG carriers to Europe, Japan, or the United States. During the course of a voyage, the LNG carried as cargo heats up and boils off at an average rate of approximately 0.12% to 0.15% of the cargo volume per day. This portion of the LNG cargo that boils off is termed BOG (Boil off Gas). In this disclosure, liquefied fuel is generally referred to as LNG.

LNG carriers have traditionally been propelled by steam turbines and diesel engines. These propulsion systems use the BOG to assist in generating power to propel the carrier. For instance, steam turbine propulsion systems use BOG to boil water to produce the necessary steam, and dual fuel diesel engines use BOG in addition to diesel as fuel for the engine. Steam turbines and diesel engines are relatively heavy and bulky, and therefore, may decease the amount of LNG that may be transported using the carrier. Gas turbine engines (GTE), which are more compact and offer a significantly higher power-to-weight ratio than diesel engines and steam turbines, have also been used to propel LNG carriers. These GTE's use BOG as a portion of the fuel needed to operate the GTE.

In a GTE, a mixture of compressed air and fuel is ignited in a combustor to produce high pressure and high temperature combustion gases. The resulting hot gases are directed over the turbine's blades, spinning the turbine, thereby, producing mechanical power. This mechanical power may be used to operate other systems of the LNG carrier. For instance, the mechanical power may be directly used to turn a propeller of the carrier, or may be used to produce electric power which, in turn, drives an electric motor coupled to the propeller. There are a number of constituents of the combustion gases that are regulated by governments of countries through which an LNG carrier operates. One of these constituents is $NO_x$. $NO_x$ is produced when nitrogen and oxygen, that are present in combustion gases, are subject to high combustion temperatures. $NO_x$ emissions from gas turbines may be lower than from diesel engines. $NO_x$ emissions and power output of gas turbines varies as a function of the intake air temperature. When ambient air temperature increases, air density decreases, and power output from the GTE decreases. With decreasing air density, $NO_x$ emissions from the GTE also decrease, until additional fuel may be required to maintain the power output. At that point, $NO_x$ emissions increase. Therefore, temperature of the air ingested by the GTE may be controlled to maintain $NO_x$ emissions within acceptable limits while increasing power production. The thermal efficiency of a gas turbine, at a defined load, varies with the intake air temperature. In the same way as described before, the temperature of the air ingested can also be controlled to optimize the thermal efficiency of the gas turbine for a given load. Another constituent of combustion gases that may be regulated is $CO_2$. For a given load and a given fuel, the emissions of $CO_2$ depend only in the thermal efficiency of the gas turbine. Optimizing the efficiency of a gas turbine therefore allows lower fuel consumption and a reduction of $CO_2$ for a given task.

U.S. Pat. No. 3,387,462 issued to Bauger et al. (the '462 patent) discloses a gas turbine engine that propels a ship carrying a cargo of liquefied combustible gas. A combination of a conventional fuel and vaporized combustible gas is used to power the gas turbine of the '462 patent. The conventional fuel is directed to the combustion chamber from the ships conventional fuel tanks, while the vaporized combustible gas is directed into the combustion chamber from the ships cargo tanks. While the '462 patent discloses a GTE for a liquefied fuel carrier application that partly uses the vaporized fuel for operation, the '462 patent does not modulate power production and $NO_x$ emissions from the GTE by ingested air temperature control.

SUMMARY OF THE INVENTION

In one aspect, a gas turbine engine system includes a gas turbine engine using vaporized liquefied gas as fuel. The gas turbine engine is configured to ingest intake air from an intake port and direct exhaust gases to an exhaust port. The gas turbine engine system includes a heat exchanger with a heat transfer fluid therein. The heat exchanger is configured to create at least a part of the fuel by heating the liquefied gas. The gas turbine engine system also includes an intake air temperature control circuit. The intake air temperature control circuit includes conduits configured to direct the heat transfer fluid to the intake port and the exhaust port. The gas turbine engine system also includes a control system configured to selectively direct the heat transfer fluid to one of the intake port and the exhaust port.

In another aspect, a method of operating a gas turbine engine is disclosed. The method includes compressing intake air to mix with a fuel and create a fuel-air mixture, and combusting the fuel-air mixture in the engine to produce a desired power output. The combustion of the mixture also produces exhaust gases including $NO_x$. The method also includes determining a threshold temperature of the ingested air. The threshold temperature is a temperature of the intake air at which the $NO_x$ is below a desired level at the desired power output. The method also includes comparing an intake air temperature with the threshold temperature, and heating the intake air to about the threshold temperature if the intake air temperature is lower than the threshold temperature, and cooling the intake air to about the threshold temperature if the intake air temperature is higher than the threshold temperature.

In yet another aspect, a method of operating an liquefied fuel transporter having an engine is disclosed. The method includes transferring heat from one or more heat producing equipment on the transporter to a heat transfer fluid, and transferring heat from the heat transfer fluid to the liquefied fuel to vaporize the liquefied fuel and produce a fuel gas. The method also includes combusting a mixture of the fuel gas and intake air in the engine. The method further includes adjusting a temperature of the intake air by transferring heat between the heat transfer fluid and the intake air.

DETAILED DESCRIPTION

Figure 1:
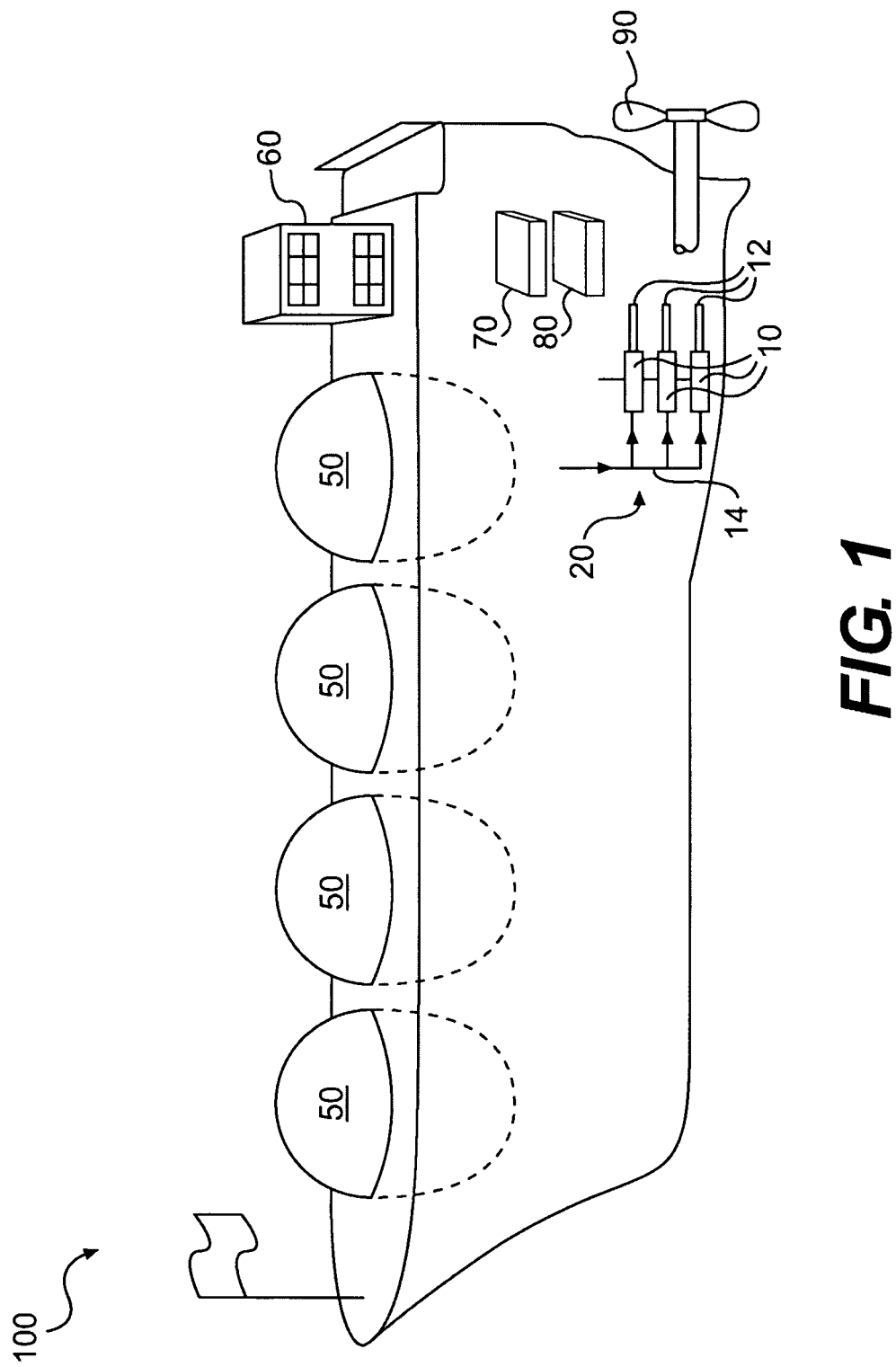
FIG. 1 is an illustration of an exemplary liquefied natural gas (LNG) carrier.

FIG. 1 illustrates an exemplary LNG carrier 100 with cargo tanks 50 that may contain LNG. In addition to LNG, cargo tanks 50 may also include various systems and devices that maintain the LNG in a liquefied state in a safe manner. LNG carrier 100 may also include a propulsion system 20 that provides motive power. Propulsion system 20 may directly or indirectly drive one or more propellers 90 to propel the ship through water. LNG carrier 100 may include other systems such as refrigeration units 60, oil coolers 80, etc. that may assist in the operation of LNG carrier 100. LNG carrier 100 may also include secondary power producing equipment such as diesel engines and/or steam turbines 70. These power producing equipment may produce the power needed to operate some systems of LNG carrier 100. Propulsion system 20 may include one or more GTE's 10 that burn fuel 14 to produce power. The power produced by GTE's 10 may rotate a shaft 12 of GTE 10. In some embodiments, shaft 12 may be mechanically coupled to propeller 90 to rotate the propeller 90. In other embodiments, shaft 12 may operate a generator (not shown) to produce electrical power. This electrical power may be used to drive an electric motor coupled to propeller 90. Propulsion system 20 may include any type of gas turbine engine known in the art. Although GTE 10 is described as producing power for the propulsion of LNG carrier 100, it is understood that GTE 10 may also produce the power required to operate other systems of LNG carrier 100.

Figure 2:
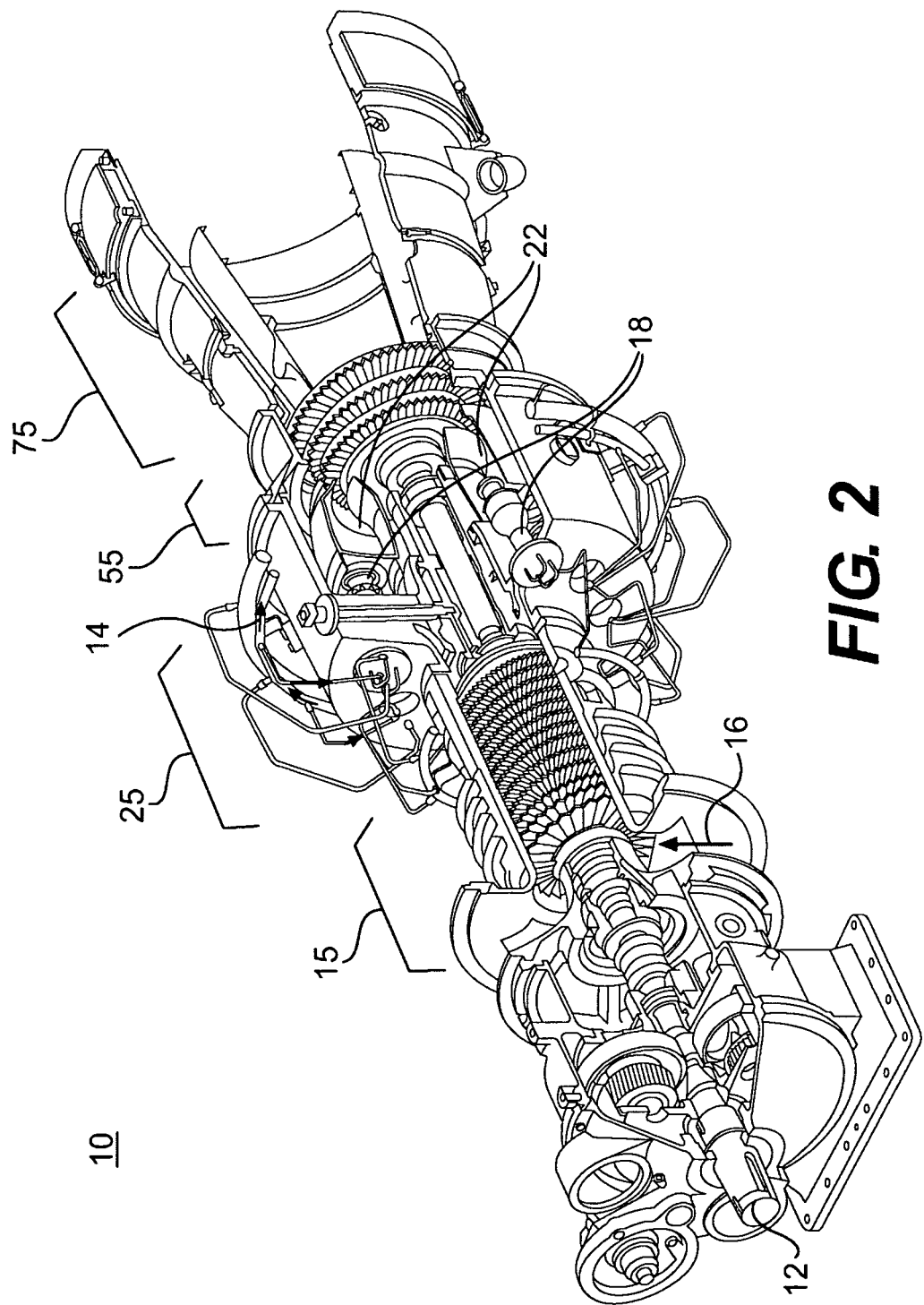
FIG. 2 is an illustration of an exemplary gas turbine engine (GTE) used in the LNG carrier of FIG. 1.

FIG. 2 illustrates an exemplary GTE 10 that may be used in propulsion system 20. GTE 10 may have, among other systems, a compressor system 15, a combustor system 25, a turbine system 55, and an exhaust system 75. Compressor system 15 may compresses air (intake air 16) to a high pressure and direct the air to combustor system 25. Combustor system 25 may mix a gaseous fuel 14 with the compressed air and burn the fuel-air mixture to produce a high-pressure, high-velocity gas that may be directed to the turbine system 55. The turbine system 55 may extract energy from the high-pressure, high-velocity gas flowing from combustor system 25, and direct the exhaust to the exhaust system 75. These exhaust gases may include regulated pollutants such as $NO_x$. The exhaust system 75 may remove some of these pollutants from the exhaust gases, and release these gases to the atmosphere.

Ambient air may be directed into compressor system 15 through filters or other particulate collection devices (not shown) to form intake air 16. Compressor system 15 may include any device capable of compressing air. In some embodiments this may include an axial flow compressor that produces a continuous flow of compressed air. The axial flow compressor may include rotating and stationary aerofoils that cooperate to compress intake air 16 to a high pressure. As intake air 16 flows through compressor system 15, the rotating aerofoils may impart energy to the passing air and the stationary aerofoils may convert the increased energy into static pressure to form compressed air. This compressed air may be directed into a combustor 22 of combustor system 25 through a plurality of fuel injectors 18 coupled thereto. As the compressed air flows through fuel injectors 18, fuel 14 may be mixed with the compressed air to form a fuel-air mixture.

Figure 3:
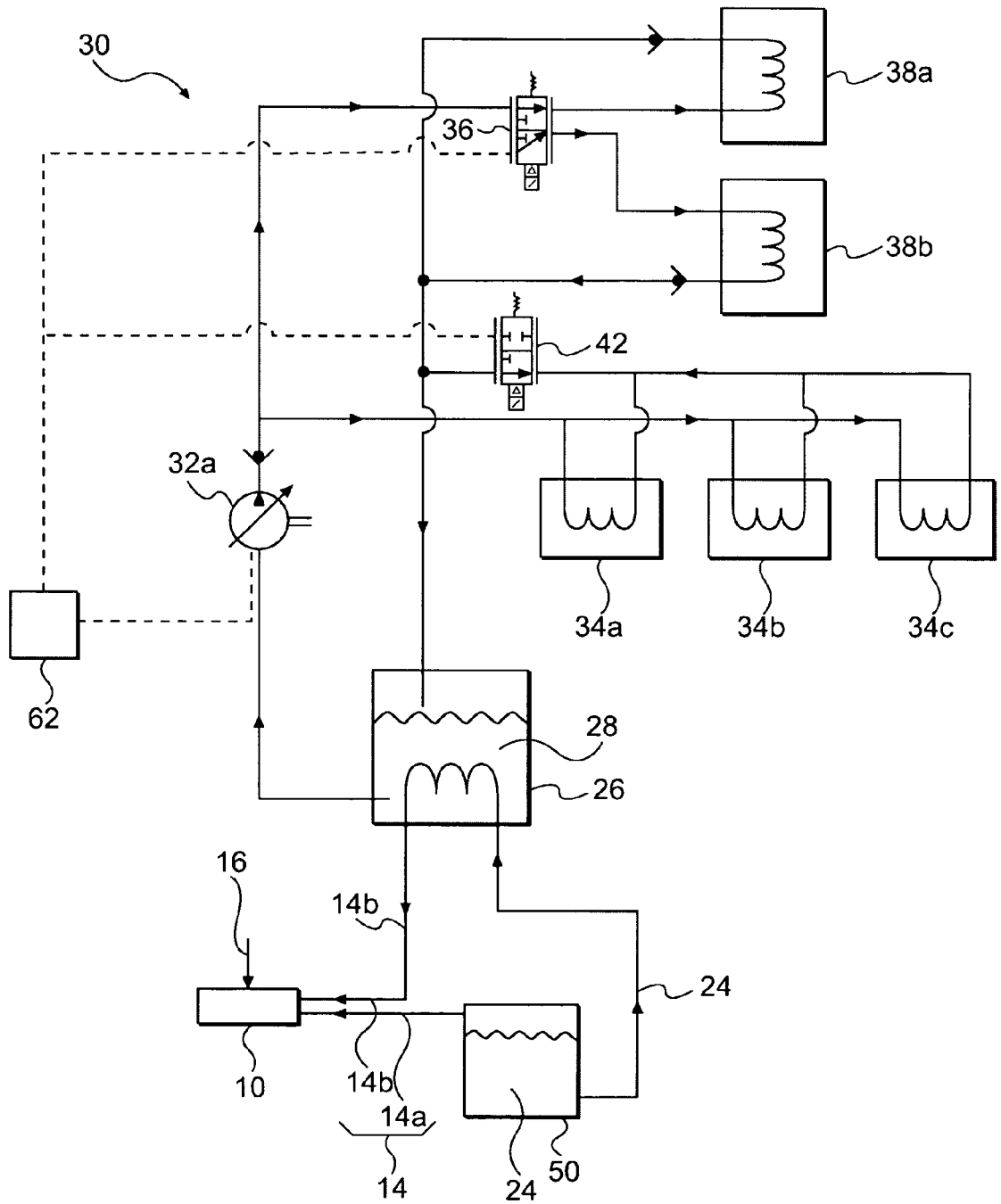
FIG. 3 is a schematic illustration of a fuel delivery system of the GTE of FIG. 2.

Fuel 14 may include vaporized LNG from cargo tanks 50. This vaporized fuel may include the portion of LNG that vaporizes in tank 50 due to ambient heat (that is, BOG). In applications where the amount of BOG may not be sufficient to operate GTE 10, fuel 14 may also include a portion of LNG from tank 50 that is intentionally vaporized. The portion of the fuel that is intentionally vaporized will be referred to as FOG (Forced off Gas). FIG. 3 illustrates a schematic of a fuel delivery system that may be used to deliver fuel 14 to GTE 10. Fuel 14, delivered to GTE 10, may include BOG 14a and FOG 14b. In embodiments, or at times where BOG 14a satisfies the fuel requirements of GTE 10, fuel 14 may not include FOG 14b. Conduits may deliver BOG 14a, formed in tank 50, to GTE 10. These conduits may include reservoirs or other collection devices to store excess BOG 14a that may be formed in tank 50. A portion of LNG 24 in tank 50 may be heated in heat exchanger 26 to form FOG 14b. Heat exchanger 26 may include a bath containing a heat transfer fluid 28, such as glycol. Fluid 28 in heat exchanger 26 may be heated by circulating the fluid 28 through a waste heat removal circuit 30. Conduits carrying a portion of LNG 24, removed from tank 50, may pass through heat exchanger 26. As the LNG 24 passes through heat exchanger 26, the hotter fluid 28 in heat exchanger 26 may transfer heat to the cooler LNG 24, thereby vaporizing LNG 24 to form FOG 14b. This FOG 14b may be directed to GTE 10. It should be emphasized that only the components necessary to describe the performance of the fuel delivery system are illustrated in FIG. 3. It is understood that the fuel delivery circuit may include other components, such as, valves, actuators, etc., configured to enhance the performance of the fuel delivery system. For instance, fuel delivery system may include control valves that control the amount of LNG 24 delivered to heat exchanger 26 to form FOG 14b. These valves may be controlled by a control system 62 of GTE 10. Fuel delivery system may also include additional conduits to recirculate unvaporized LNG 24 through heat exchanger 26, or return residual LNG 24 back to tank 50, or another reservoir.

Waste heat removal circuit 30 may circulate fluid 28 through components and systems of LNG carrier 100 that discharge heat. Fluid 28 may get heated by absorbing a portion of this dissipated heat and return to heat exchanger 26 in a heated state. The heated fluid 28 in heat exchanger 26 may transfer a portion of the heat to LNG 24 circulating through heat exchanger 26, and cool down. The cooled fluid 28 may be circulated through the waste heat removal circuit 30 again to absorb the discharged heat from the heat dissipating components. Thus, the heat transfer fluid fluid 28 may heat LNG 24 to form FOG 14b by transferring dissipated heat from heat producing components of LNG carrier 100 to LNG 24.

Waste heat removal circuit 30 may circulate fluid 28 through any heat generating components of LNG carrier 100. In the embodiment illustrated in FIG. 3, these components include generators 34a, 34b, and 34c, a condenser 38a of steam turbine 70, and a radiator 38b of oil cooler 80. One or more pumps, such as a hydraulic pump 32a, may direct the flow of fluid 28 through the waste heat removal circuit 30. Control valves, such as first control valve 36 and second control valve 42, may control the flow of flow of fluid 28 through the heat generating components. Control system 62 may control the operation of the pump and the valves. For instance, first control valve 36 may selectively direct fluid 28 in the circuit to condenser 38a or radiator 38b depending upon some selection criterion, such as part temperature, and second control valve 42 may control the amount of fluid 28 flow through the generators 34a, 34b, and 34c based on a selection criterion. It is understood that the arrangement of control valves depicted in FIG. 3 are exemplary only, and that the waste heat removal circuit 30 may have any arrangement of valves.

Fuel 14 delivered to fuel injector 18 may mix with compressed air to form a fuel-air mixture and proceed to combustor 22 for combustion. The amount of fuel 14 that may be mixed with the compressed air may depend upon the mass flow rate of compressed air through fuel injector 18. The mass flow rate of compressed air is the mass of compressed air flowing through the fuel injector per unit of time. Mass flow rate may be mathematically expressed as $m=\rho \times V \times A$. Where V is the velocity of air, A is the cross-sectional area available for air flow through the fuel injector 18, and $\rho$ is the density of air. The mass flow rate of air through fuel injector 18 increases with the density of air. The higher the mass flow rate of air, higher will be the mass flow rate of fuel-air mixture into combustor 22. Higher mass flow rate of fuel-air mixture in combustor 22, in turn, increases the mass of combustion gases produced by burning the fuel air mixture, and the resulting power output of GTE 10.

Air flow into GTE 10 and efficiency of GTE 10 are dependent on engine load and temperature of intake air 16. Power output of GTE 10 is reduced by increasing the temperature of intake air 16. For a given engine load (that is, constant power), $NO_x$ emissions, $CO_2$ emissions, and engine efficiency show a dependency on the temperature of intake air 16. Since $NO_x$ is formed due to a high temperature reaction between nitrogen and oxygen (that are present in combustion gases), decreasing intake air 16 temperature also increases $NO_x$ content in combustion gases.

During a voyage, LNG carrier 100 travels through different regions of the world with widely varying temperatures, therefore, ambient air temperature, and thereby density of intake air 16, varies from day to day. On a day when LNG carrier 100 travels through a cold region, the power produced by GTE 10, and the $NO_x$ emitted, may be higher than on a day when LNG carrier 100 travels through a warm region of the world. By controlling the temperature of intake air 16, both $NO_x$ emissions and the power produced by GTE 10 may be optimized. For instance, when LNG carrier 100 is at a location where the power demands are higher (as when LNG carrier traverses through rough seas) and $NO_x$ emission standards are less restrictive, intake air 16 temperature may be reduced to increase the power produced by GTE 10. Likewise, when LNG carrier 100 is in a region where $NO_x$ emission standards are more stringent and power demands on GTE 10 are lower (as in a port facility), intake air 16 temperature may be increased to reduce $NO_x$ emissions by sacrificing power. When LNG carrier 100 is cruising through an area where power requirements are relatively uniform, intake air 16 temperature may be controlled to maintain $NO_x$ emissions at a minimum rate for the desired power output.

Figure 4:
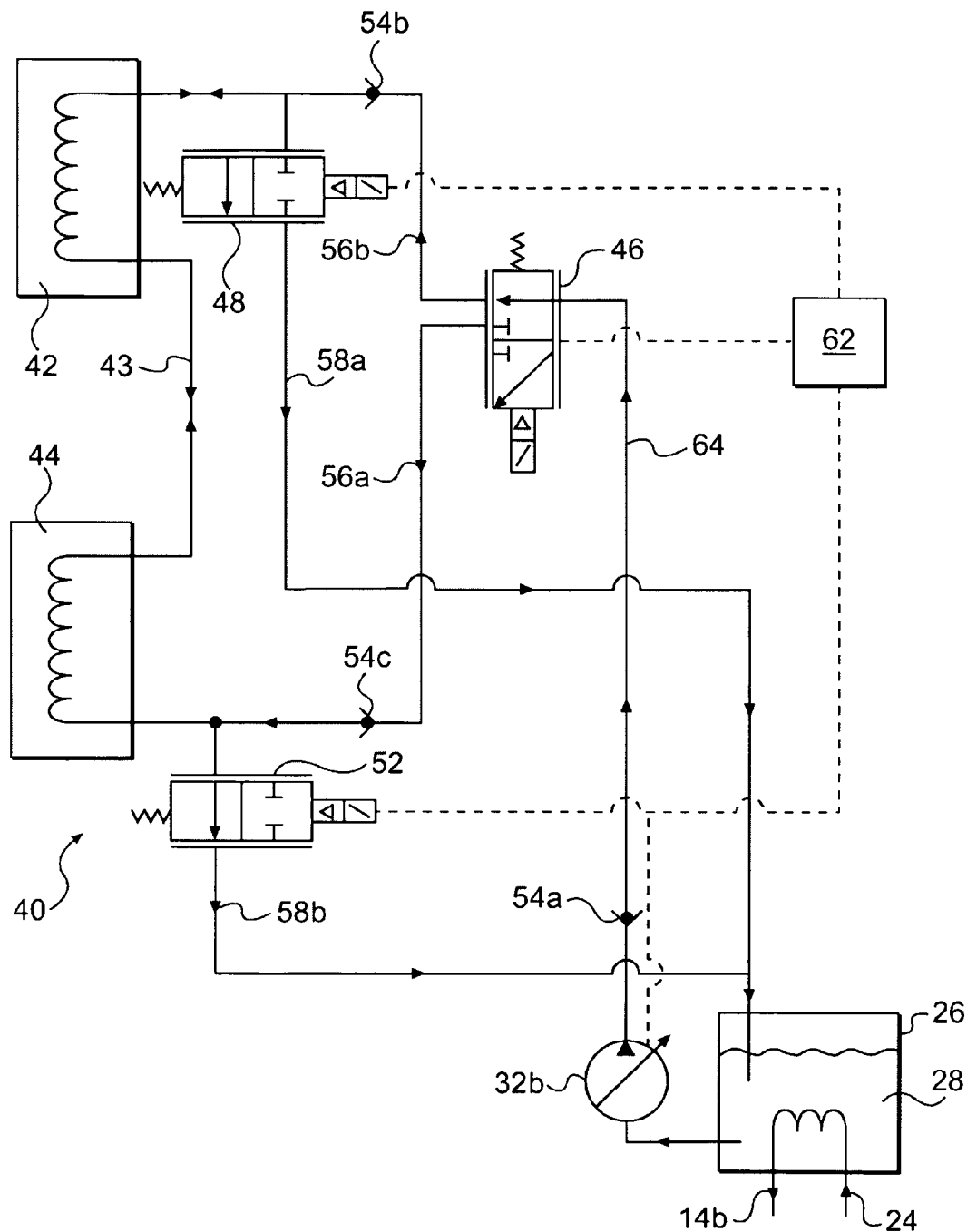
FIG. 4 is a schematic illustration of an exemplary intake air temperature control circuit of the GTE of FIG. 2.

FIG. 4 illustrates an exemplary intake air temperature control circuit 40 (ITCC 40) that may be used to control the temperature of air ingested by GTE 10. ITCC 40 may circulate fluid 28 from heat exchanger 26 between an exhaust port 42 and an intake port 44 of GTE 10. At exhaust port 42, heat transfer may occur between exhaust gases from GTE 10 and fluid 28, and at intake port 44, heat transfer may occur between intake air 16 and fluid 28. Fluid 28 from heat exchanger 26 may be pumped to control valve 46 by a pump 32b through a first check valve 54a. Control valve 46 may direct the flow of fluid 28 from pump 32b to intake port 44 or exhaust port 42 of GTE 10, based on a signal from a control system 62. When it is desired to heat intake air 16, control system 62 may actuate control valve 46 to direct fluid 28 through conduit 56b to exhaust port 42. When control valve 46 is actuated to direct flow to conduit 56b, control valve 48 may be actuated to a closed position and control valve 52 may be actuated to an open position. As the fluid 28 passes through the exhaust port 42, the fluid 28 may get heated by the heat of the exhaust gases. The fluid 28 from the exhaust port 42 may then proceed to intake port 44 through conduit 43. As the fluid 28 passes through intake port 44, the hotter fluid 28 may transfer heat to the cooler intake air 16 passing through intake port 44, resulting in heating of the intake air 16. After exiting the intake port 44, fluid 28 may return to heat exchanger 26 through open control valve 52 and conduit 58b. Check valve 54b may control the rate of flow of fluid 28 through exhaust and intake port 44, and 44, and thereby control the temperature to which intake air 16 is heated.

When it is desired to cool intake air 16, control system 62 may actuate control valve 46 to direct flow of fluid 28 in conduit 64 to intake port 44 through conduit 56a. When control valve 46 is actuated to direct flow to conduit 56a, control valve 48 may be actuated to an open position and control valve 52 may be actuated to a closed position. As the fluid 28 flows through the intake port 44, the cooler fluid 28 (due to heat transfer with LNG 24 to produce FOG 14b) may cool the intake air 16. The fluid 28 may then proceed to the exhaust port 42 through conduit 43 and return to heat exchanger 26 through control valve 48 and conduit 58a. Check valve 54c on conduit 56a may control the temperature to which intake air 16 is cooled by controlling the rate of flow of fluid 28 through the intake port 44. The layout of the hydraulic devices (pump, control valves and check valves) illustrated in FIG. 4 is exemplary only. It is understood that these or other devices may be located anywhere in the circuit to transfer heat from intake air 16 to the fluid 28 when it is desired to cool intake air 16, and transfer heat from the exhaust gases to intake air 16 when it desirable to heat intake air 16.

In some embodiments, the waste heat removal circuit 30 (shown in FIG. 3) may be combined with ITCC 40. In such an embodiment, some devices of both systems may be combined. For example, pumps 32a and 32b may be replaced with one pump. Control system 62 may control the flow of fluid 28 in the waste heat removal circuit 30 and ITCC 40 to heat/cool intake air 16 as desired. Although not illustrated in FIGS. 3 and 4, it is understood that sensors and other monitoring devices may also provide feedback to control system 62. For instance, a sensor may indicate the need for GTE 10 to produce more power, and in response, control system 62 may control the flow of fluid 28 in the system.

INDUSTRIAL APPLICABILITY

The disclosed engine with intake air temperature control system may be applicable for any engine in which performance may be enhanced by intake air temperature control. Although particularly relevant for a gas turbine engine application having a ready source of cold liquefied fuel, such as a liquefied fuel transporter, the disclosed engine system may be used in any application. When the gas turbine engine is operating in regions where $NO_x$ emissions standards are less restrictive, the temperature of the intake air into the GTE may be decreased to increase power production, while increasing $NO_x$ emissions. When the gas turbine engine is operating in regions where $NO_x$ emission standards may be more restrictive, intake air temperature may be increased to reduce $NO_x$ emissions at the expense of power output. By varying the intake air temperature to enable a tradeoff between $NO_x$ emission and power production, $NO_x$ emissions by the GTE may be maintained at minimum rate for a desired power output. The operation of a gas turbine engine system for an LNG carrier will now be described.

LNG carrier 100 with a GTE 10 system may be cruising along the high seas to transport LNG 24 between two locations. During the voyage, a portion of LNG 24 in tanks 50 may naturally vaporize (due to ambient heat) and form BOG 14a. This BOG 14a may form a part of fuel 14, and may be directed to GTE 10 for combustion. A portion of LNG 24 from tank 50 may also be forcibly vaporized to form FOG 14b, by circulating LNG 24 through heat exchanger 26. In heat exchanger 26, the LNG 24 may get heated, and vaporize to form FOG 14b, as a result of heat transfer with fluid 28 circulating therein. BOG 14a and FOG 14b may form the fuel 14 for GTE 10, and may be directed to GTE 10 for combustion. During a period of its voyage, the power requirements of LNG carrier 100 may be relatively constant (for instance, at about A megawatts). During the same time period, LNG carrier 100 may traverse through regions having widely varying ambient temperatures. Varying ambient temperature may change the temperature of intake air 16 directed into GTE 10, thereby causing variation in power output and $NO_x$ emissions of GTE 10. Control system 62 may include data on the relationship between intake air 16 temperature, $NO_x$ emission, and power output of GTE 10. Based on this relationship, control system 62 may vary the intake air 16 temperature to achieve the desired power output at an acceptable level of $NO_x$ emission.

Figure 5:
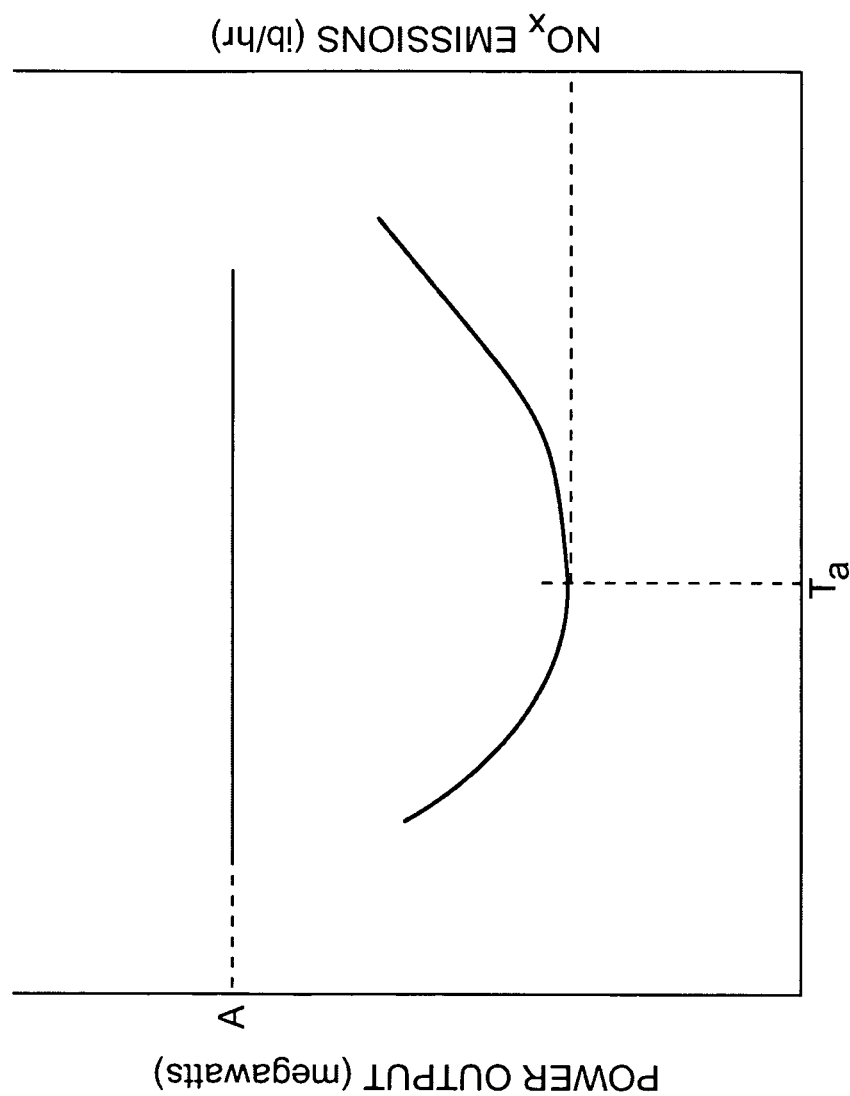
FIG. 5 is a graphical illustration of the relationship between $NO_x$ emission and intake air temperature for a fixed power output of the GTE of FIG. 2.

FIG. 5 illustrates the relationship between $NO_x$ emission of GTE 10 and intake air temperature for a fixed power output of A megawatts. As seen in FIG. 5, for a power output of A megawatts, $NO_x$ emission from GTE 10 may be minimized while operating at an intake air 16 temperature of about $T_A$° F. As ambient air temperature decreases below $T_A$° F., air density increases and $NO_x$ emissions from GTE 10 increases. As ambient temperature increases above $T_A$° F. air density decreases and additional fuel may be required to maintain the power output of A megawatts. As a result of the increased fuel supply, $NO_x$ emission may increase.

Figure 6:
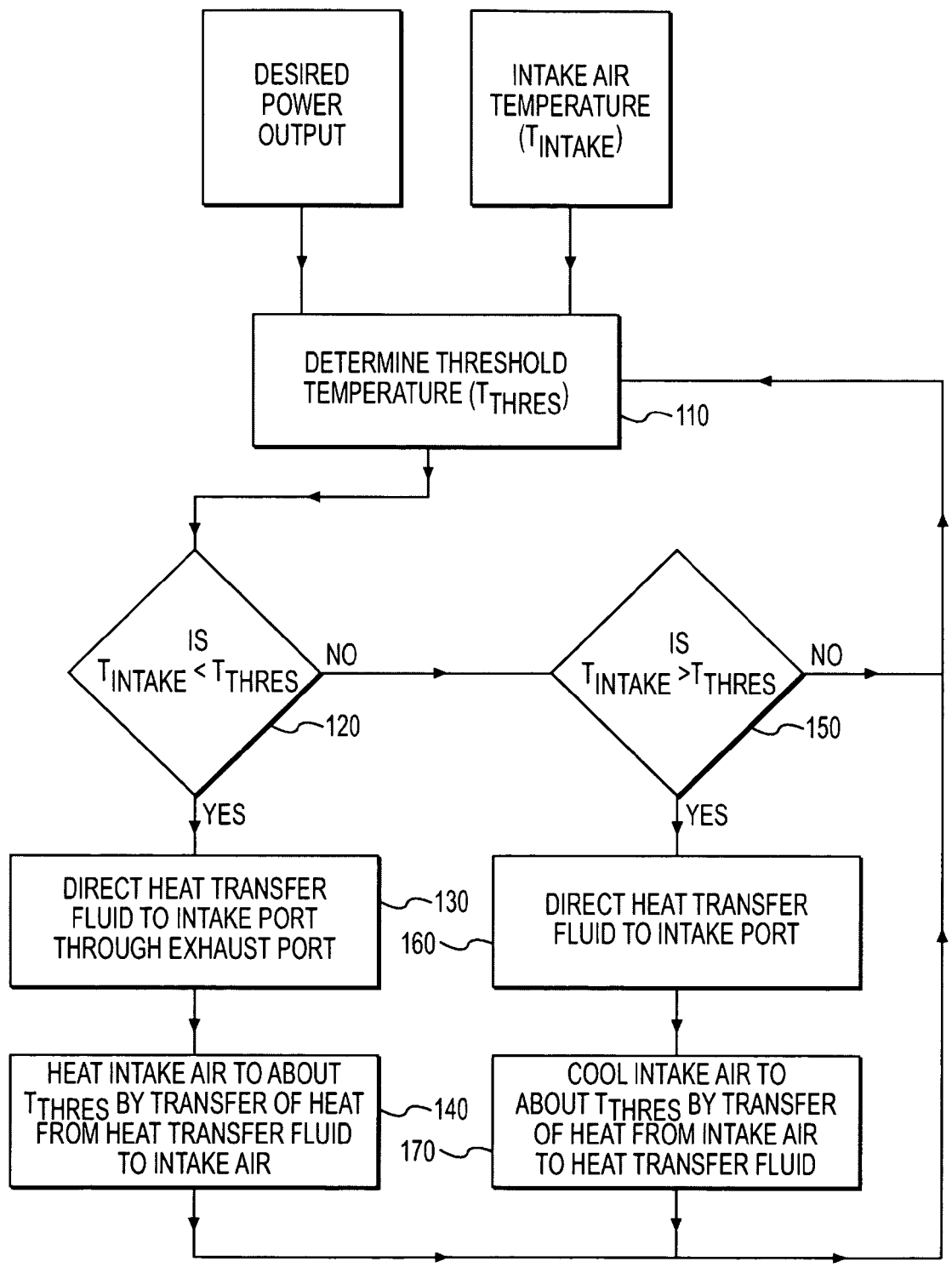
FIG. 6 is a flow chart illustrating the control of intake air temperature of the GTE of FIG. 2.

FIG. 6 is a flow chart that illustrates intake air temperature control to maintain desired power production at an acceptable level of $NO_x$ emission. Input to control system 62 (sensor or other input) may include the intake air temperature ($T_{INTAKE}$), and a desired power output of GTE 10. The control system 62 may then determine a threshold temperature ($T_{THRES}$) of intake air 16 that which will produce the desired power output while keeping $NO_x$ emissions within acceptable limits (step 110). In some embodiments, this threshold temperature $T_{THRES}$ may be the intake air temperature at which $NO_x$ emission by GTE 10 is minimum for the desired power output (that is, $T_A$ of FIG. 5). Control system 62 may compare $T_{INTAKE}$ with $T_{THRES}$. If $T_{INTAKE}$ is less than $T_{THRES}$ (step 120), control system 62 may direct fluid 28 in heat exchanger 26 to intake port 44 through exhaust port 42 (step 130). Control system 62 may control the rate of flow of fluid 28 through exhaust port 42 and intake port 44 so that intake air 16 is heated to a temperature of about $T_{THRES}$ (step 140).

If, however, $T_{INTAKE}$ is higher than $T_{THRES}$ (step 150), control system 62 may direct the fluid 28 in heat exchanger 26 to intake port 44 (step 160). Heat may be transferred from the intake air 16 to the fluid 28. Control system 62 may control the rate of flow of fluid 28 through intake port 44 so that intake air 16 is cooled to a temperature of about $T_{THRES}$ (step 170). When the temperature of intake air 16 reaches $T_{THRES}$, control system 62 may maintain the operation of GTE 10 in this condition until a change in power output requirements necessitates changing the intake air temperature to a new threshold temperature.

It should be emphasized that, although the disclosed engine with intake air temperature control system is described as a gas turbine engine in a LNG carrier application, embodiments of the disclosed engine may be used in any application. For instance, an embodiment of the disclosure may be used in a reciprocating engine of a LNG carrying truck. Other embodiments of the disclosed engine with intake air temperature control system may be used in a power plant application. In each of these applications, the temperature of the intake air into the engine may be actively controlled to optimize power output, fuel efficiency, $NO_x$ and $CO_2$ emission. For instance, in a power plant application, temperature of the intake air may be cooled on hot days to increase power output, and the intake air temperature may be increased on days where $NO_x$ and $CO_2$ emission may need to be decreased.

It will be apparent to those skilled in the art that various modifications and variations can be made to the disclosed engine with intake air temperature control system. Other embodiments will be apparent to those skilled in the art from consideration of the specification and practice of the disclosed engine system. It is intended that the specification and examples be considered as exemplary only, with a true scope being indicated by the following claims and their equivalents.

We claim:

1. A gas turbine engine system comprising:
a gas turbine engine using a vaporized liquefied gas as fuel, the gas turbine engine configured to ingest intake air from an intake port and direct exhaust gases to an exhaust port;
a heat exchanger with a heat transfer fluid therein, the heat exchanger being configured to transfer heat between the liquefied gas and the heat transfer fluid to create at least a part of the fuel by vaporizing the liquefied gas;
an intake air temperature control circuit, the intake air temperature control circuit including conduits configured to direct the heat transfer fluid to the intake port and the exhaust port; and
an electronic control system programmed to heat and cool the intake air at the intake port by selectively directing the heat transfer fluid to the intake port and the exhaust port.

2. The gas turbine engine system of claim 1, further including a waste heat removal circuit, the waste heat removal circuit is configured to transfer heat from one or more heat generating equipment to the heat transfer fluid.

3. The gas turbine engine system of claim 1, wherein the conduits include;
   a first conduit fluidly coupling the heat exchanger with the intake port;
   a second conduit fluidly coupling the heat exchanger with the exhaust port; and
   a third conduit fluidly coupling the exhaust port to the intake port.

4. The gas turbine engine system of claim 3, wherein the control system is programmed to direct the heat transfer fluid to the first conduit when an intake air temperature is higher than a threshold temperature.

5. The gas turbine engine system of claim 4, wherein the control system is programmed to direct the heat transfer fluid to the second conduit when the intake air temperature is below the threshold temperature.

6. The gas turbine engine system of claim 5, wherein the control system is further programmed to direct the heat transfer fluid from the exhaust port to the intake port through the third conduit when the intake air temperature is below the threshold temperature.

7. The gas turbine engine system of claim 1, further including one or more hydraulic valves coupled to the conduits, at least some of the one or more hydraulic valves being controllable by the control system.

8. The gas turbine engine system of claim 7, wherein the one or more hydraulic valves includes a control valve configured to direct the heat transfer fluid to the intake port when an intake air temperature is higher than a threshold temperature, and to the exhaust port when the intake air temperature is below the threshold temperature.

9. The gas turbine engine system of claim 1, wherein the control system is programmed to selectively direct the heat transfer fluid through the intake port and the exhaust port to (a) cool the intake air when a temperature of the intake air exceeds a threshold temperature, and (b) heat the intake air when the temperature of the intake air is below the threshold temperature.

10. The gas turbine engine of claim 1, wherein the control system is programmed to direct the heat transfer fluid to the intake port through the exhaust port to heat the intake air.

11. A gas turbine engine system, comprising:
   a gas turbine engine using a vaporized liquefied gas as fuel, the gas turbine engine configured to ingest intake air from an intake port and direct exhaust gases to an exhaust port;
   a heat exchanger configured to transfer heat from a heat transfer fluid to the liquefied gas to create at least a portion of the fuel by vaporizing the liquefied gas; and
   an electronic control system programmed to;
      cool the intake air using the heat transfer fluid when a temperature of the intake air is above a threshold temperature; and
      heat the intake air using the heat transfer fluid when the temperature of the intake air is below the threshold temperature.

12. The gas turbine engine system of claim 11, further including a waste heat removal circuit, the waste heat removal circuit including a network of conduits adapted to circulate the heat transfer fluid through a plurality of heat generating equipment of the gas turbine engine system to transfer heat from the plurality of heat generating equipment to the heat transfer fluid.

13. The gas turbine engine system of claim 11, wherein the control system is programmed to (a) direct the heat transfer fluid from the heat exchanger to the intake port, through the exhaust port, to heat the intake air when the temperature of the intake air is below the threshold temperature, and (b) direct the heat transfer fluid from the heat exchanger to the intake port, without passing through the exhaust port, to cool the intake air when the temperature of the intake air is above the threshold temperature.

14. The gas turbine engine system of claim 11, wherein the control system is programmed to (a) direct the heat transfer fluid first to the intake port and then to the exhaust port when the temperature of the intake air is above the threshold temperature, and (b) direct the heat transfer fluid first to the exhaust port and then to the intake port when the temperature of the intake air is below the threshold temperature.

15. The gas turbine engine of claim 11, wherein the control system is further programmed to determine the threshold temperature of the intake air based on a desired power output and acceptable $NO_x$ emission of the gas turbine engine.

16. A gas turbine engine system, comprising:
   a gas turbine engine using a vaporized liquefied gas as fuel, the gas turbine engine configured to ingest intake air and release exhaust gases including $NO_x$;
   a heat exchanger configured to transfer heat from a heat transfer fluid to the liquefied gas to create at least a portion of the fuel by vaporizing the liquefied gas;
   a waste heat removal circuit, the waste heat removal circuit including a network of conduits adapted to circulate the heat transfer fluid through one or more heat generating equipment of the gas turbine engine system to transfer heat from the one or more heat generating equipment to the heat transfer fluid; and
   an electronic control system programmed to heat and cool the intake air using the heat transfer fluid to adjust a temperature of the intake air toward a threshold temperature.

17. The gas turbine engine system of claim 16, wherein the gas turbine engine is used as a power source of a transport vehicle of the vaporized liquefied gas.

18. The gas turbine engine system of claim 16, wherein the control system is programmed to transfer heat from the exhaust gases to the intake air to heat the intake air when the a temperature of the intake air is below the threshold temperature.

19. The gas turbine engine system of claim 16, wherein the control system is further programmed to determine the threshold temperature of the intake air based on a desired power output and acceptable $NO_x$ emission of the gas turbine engine.

20. The gas turbine engine system of claim 16, wherein the waste heat removal circuit further includes one or more hydraulic valves coupled thereto, the one or more hydraulic valves being configured to selectively direct the heat transfer fluid to selected heat generating equipment of the one or more heat generating equipment.

* * * * *